Feb. 2, 1965   A. B. BELGARD   3,168,741
DECORATIVE EYEGLASS LENS MOUNT
Filed April 4, 1961
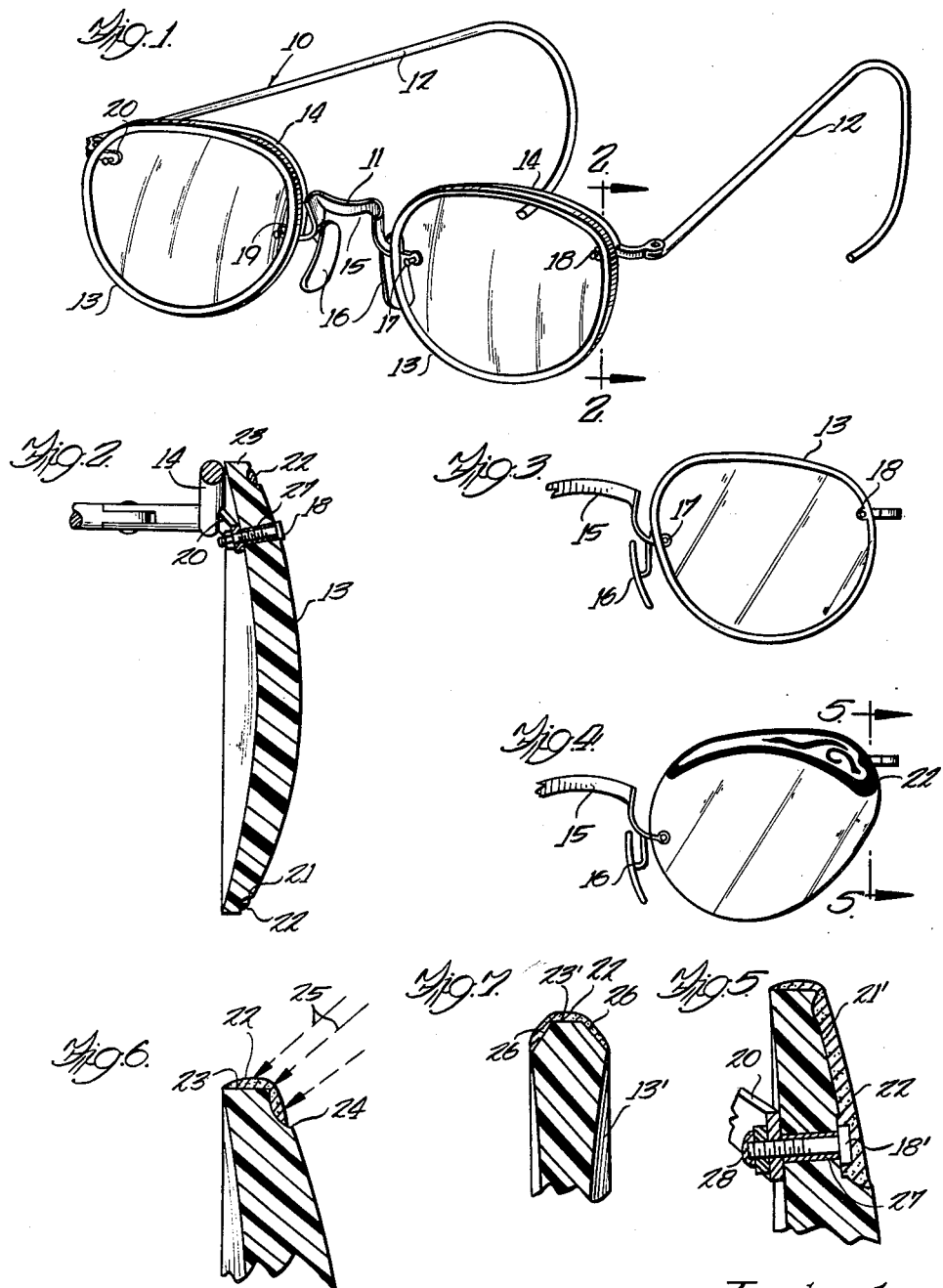
Inventor
Austin B. Belgard
Dawson, Tilton, Fallon & Lungmus
Attorneys

United States Patent Office 3,168,741
Patented Feb. 2, 1965

3,168,741
DECORATIVE EYEGLASS LENS MOUNT
Austin B. Belgard, 3226 Sprucewood, Wilmette, Ill.
Filed Apr. 4, 1961, Ser. No. 100,650
5 Claims. (Cl. 351—51)

This invention relates to eyeglass construction, and more specifically, to eyeglasses of improved and relatively lightweight construction.

An object of the present invention is to provide "rimless" eyeglasses substantially lighter in weight than ordinary glasses while having an appearance similar to conventional rimmed glasses or glasses having decorative brow bars. Another object is to provide a pair of glasses having substantially shatter proof plastic lenses treated and mounted upon a rimless frame to give the appearance of glasses having rims or brow bars. In this connection, it is a specific object to provide eyeglass lenses which have been treated so that peripheral surface decorations are permanently affixed thereto.

Another object is to provide an eyeglass construction in which plastic lenses are affixed to the arms of a supporting frame in such a way that an extremely sturdy and durable union is formed between the parts. A specific object is to provide such a union in which certain of the elements connecting the frame and lenses are concealed when the eyeglasses are viewed from the front thereof. A still further object is to provide eyeglasses with the appearance of having rimmed lenses but which may be easily adjusted without heating or otherwise treating the frame thereof prior to such adjustment. An additional object is to provide eyeglasses in which the "rims" thereof are non-supporting portions of the lenses; thus, there is no danger that such "rims" will warp the plastic lenses under conditions which might tend to distort or cause dimensional changes in the plastic frames and rims of ordinary glasses. Yet another object is to provide spectacles having plastic lenses with permanent surface markings which not only give the impression of structural supporting elements without the weight and bulk thereof but which perform the function of reducing peripheral glare.

Other objects will appear from the specification and drawings in which:

FIGURE 1 is a perspective view of a pair of eyeglasses embodying the present invention;

FIGURE 2 is an enlarged sectional view taken along line 2—2 of FIGURE 1;

FIGURE 3 is a broken front elevational view showing one lens of the spectacles illustrated in FIGURE 1;

FIGURE 4 is a broken front elevational view showing a lens of a pair of eyeglasses constituting a second form of the invention;

FIGURE 5 is an enlarged vertical sectional view taken along line 5—5 of FIGURE 4;

FIGURE 6 is an enlarged sectional view of the edge portion of the lens for a pair of eyeglasses constituting a further embodiment of the invention;

FIGURE 7 is an enlarged sectional view of the lens for eyeglasses constituting a still further form of the invention.

In the embodiment of the invention described herein, and referring particularly to FIGURES 1-3, the numeral 10 generally designates eyeglasses comprising a frame 11, temple members 12 and lenses 13. The frame consists of a pair of arms 14 of arcuate shape which are rigidly connected at their inner ends to nose piece 15 and are pivotally connected at their outer ends to the temple pieces 12. Pads 16 are affixed to the nose piece and may be formed from plastic or any other suitable material. The rest of the frame is preferably formed of metal. Since the frame is entirely conventional, a further description of its structure, except for the parts which secure the lenses 13 in place, is believed unnecessary herein.

Each of the lenses 13 is formed from plastic material and, in the illustration given, is apertured at two points adjacent the periphery thereof to receive bolts 17 and 18 connected to nasal and temporal lungs 19 and 20 provided by the frame 11 at opposite ends of each arm. Arms 14 are disposed behind the upper edge portions of each of the lenses and follow the upper edge contour of those lenses.

While the eyeglass lenses give every appearance of being provided with conventional rims, they are in fact rimless; that is, they lack the conventional retaining rims which ordinarily perform a lens-supporting function. Each lens is debossed or engraved about its edge to provide a peripheral groove or channel 21 along the outer face thereof. This channel is filled, or partially filled, with a pigment-containing material 22 which is fused with the plastic of the lens to form an integral part thereof. Where each lens is formed from a plastic material such as methyl methacrylate, material 22 may constitute a pigmented acrylic resin capable of fusing with the material of the lens as the resin is cured. Other pigmented materials capable of fusing or copolymerizing with a selected plastic lens material may also be used. For example, where the lens is formed from an allyl polyester resin such as allyl diglycol carbonate, the pigmented material may also constitute an allyl resin which, upon heating, will form a hard filler bonded to the lens.

The "rim" of pigmented material 22 about the periphery of each lens reduces the amount of light passing through the edges of the lens, particularly because of the deep channel in which the pigmented material is fixed. Even further reduction in the transmission of peripheral light rays, which produce objectionable side edge glare, may be achieved by coating the edge surfaces 23. As indicated in FIGURE 6, the extension of the pigmented material 22 over edge surface 23 as well as the surface of channel 21 substantially increases the blocking of light rays 25 without appreciably increasing the weight of the lenses. For a myopia-corrective lens 13′ of the type illustrated in FIGURE 7, the pigmented resinous material 22 may be fused to edge surfaces 26 as well as peripheral edge surface 23′, thereby blocking the transmission of inwardly directed peripheral light rays. Edge surfaces 26 are preferably beveled to reduce the thickness of the characteristically wide periphery of a myopia-corrective lens and to simulate more closely the appearance of a conventional rimmed lens.

As already mentioned, each lens is held in place by a pair of bolts 17 and 18 located adjacent the lens' nasal and temporal edge portions. Referring again to FIGURES 1-3, and particularly to FIGURE 2, it will be observed that the lens openings through which the bolts pass are slightly larger than the diameters of the bolts and that the threaded space about the shank of each bolt contains a quantity of resinous material 27. This material is capable of fusing with the lense and will ordinarily be the same composition as the pigmented material 22 within the peripheral channel 21. When the sleeve of resinous material 27 is fully cured, the shaft of the bolt extending therethrough is tightly anchored in place and the slight movements of the bolt which might result in rapid wear and enlargement of the lens opening are prevented.

The peripheral grooves or channels containing the pigmented material need not extend about the entire circumference of each lense but may, as illustrated in FIGURES 4 and 5, be located only along a portion of the lens' periphery. In this modification, grooves 21′ are shaped to define a simulated brow bar. Like bolt 18, bolt 18′ is imbedded in a sleeve or sheath 27′ of resinous plastic material fused with the material of the lens proper. However, the bolt opening is located in groove 21' and, therefore, when the bolt is securely fastened in place, as illustrated in FIGURE 5, the pigmented plastic material 22 extends over the head of the bolt and conceals it within the channel. When viewed from the front of the lens, the temporal connection of the lens to the frame is thus concealed. If desired, a spot of resin 28 may be applied to the threaded end of the bolt to lock the nut in place.

From the above, it is believed apparent that the eyeglasses disclosed herein have the appearance of glasses with frame portions about the periphery of the lenses without the weight and other disadvantages ordinarily associated with such frame portions. As far as weight reduction is concerned, a pair of glasses of the type illustrated in FIGURE 1 should, depending upon the particular plastic selected for the lenses, be 30 to 50 percent lighter in weight than corresponding glass-lens spectacles having solid lens-retaining rims and having generally the same appearance. Furthermore, since the simulated rims or brow bars disclosed herein are integral portions of the lenses themselves, there is no danger that the rims or bars might warp the plastic lenses, a problem which might otherwise arise if the bars or rims provided structural support.

While in the foregoing several embodiments of the invention have been disclosed in considerable detail for purposes of illustration, it will be understood by those skilled in the art that many of these details may be varied without departing from the spirit and scope of the invention.

I claim:
1. A pair of lightweight eyeglasses comprising a frame having nose and temple pieces and having a pair of arm portions, each of said arm portions having at least one apertured lug, a pair of transparent plastic lenses secured to said frame in front of said arm portions and in front of the lugs thereof, each of said lenses having at least one aperture in register with the aperture of a lug directly therebehind, and head-providing connecting elements extending through said apertures and securing said lenses to said lugs, each of said lenses having peripheral portions thereof coated with a pigmented plastic material, said pigmented plastic material being fused to said plastic lenses and defining simulated frame portions therefor, and a sheath of plastic material fused to each of said lenses within the aperture thereof and securely anchoring said connecting element within the aperture of said lens, the heads of said connecting elements being disposed on the front sides of said lenses and being covered by the pigmented plastic material fused to said lenses.

2. The structure of claim 1 in which each of said lenses has its front face engraved along the periphery thereof to provide at least one pigment-retaining groove, said pigmented plastic material being disposed within said grooves and fused to the plastic of said lenses therein.

3. A pair of eyeglasses comprising a frame having nose and temple pieces and having apertured lugs adjacent the nasal and temporal portions thereof, a pair of transparent plastic lenses, each of said lenses having peripheral grooves along the front face thereof, each of said lenses also being provided with apertures in register with the apertures of said lugs, at least one of the apertures of each lens being located in a peripheral groove, said lugs being disposed behind said lenses, connecting elements extending through the apertures of said lenses and said lugs to secure said lenses to said frame, said connecting elements being provided with enlarged heads on the front sides of said lenses, and a hardened pigmented plastic material disposed within said peripheral grooves and fused to the plastic of said lenses to define simulated frame portions for said eyeglasses, said pigmented plastic material extending over and about said heads of said connecting elements to conceal the head disposed within said peripheral grooves.

4. A lens mounting comprising a frame having at least one lug apertured for supporting an eyeglass lens, a transparent plastic lens disposed in front of said frame and said lugs and having a peripheral groove in the front surface thereof, said lens also having an opening therethrough disposed within said groove and in register with the aperture of said lug directly behind said lens, a connecting element having a threaded shaft portion extending through said opening and said aperture and having an enlarged head portion disposed within said groove, and a hardened pigmented plastic material disposed within said groove and fused to the plastic of said lens, said head being embedded and concealed within the pigmented plastic material within said groove.

5. The structure of claim 4 in which the opening through said lens is of substantially greater diameter than the diameter of the threaded shaft portion of said connecting element, said pigmented plastic material extending into said opening about said shaft portion for anchoring said connecting element in place.

References Cited in the file of this patent
UNITED STATES PATENTS

| | | |
|---|---|---|
| 1,984,448 | Winston | Dec. 18, 1934 |
| 2,174,304 | Anderson et al. | Sept. 26, 1939 |
| 2,225,038 | Diggins | Dec. 17, 1940 |
| 2,310,133 | Uhlemann et al. | Feb. 2, 1943 |
| 2,328,708 | Cook et al. | Sept. 7, 1943 |
| 2,362,726 | Slotsky | Nov. 14, 1944 |